United States Patent [19]

Gordon

[11] 4,016,904

[45] Apr. 12, 1977

[54] SAFETY VENT VALVE

[75] Inventor: Edmund A. Gordon, Philadelphia, Pa.

[73] Assignee: Central Safety Equipment Co., Wyncote, Pa.

[22] Filed: Dec. 29, 1975

[21] Appl. No.: 644,659

[52] U.S. Cl. .............................. 137/493.9; 137/315
[51] Int. Cl.² ...................................... F16K 17/26
[58] Field of Search ............ 137/493.9, 493.6, 493

[56] References Cited

UNITED STATES PATENTS

| 1,493,083 | 5/1924 | Ripley | 137/493.9 |
| 2,103,935 | 12/1937 | Cossais | 137/493.9 X |
| 3,092,137 | 6/1963 | Van Eldikthieme | 137/493 |
| 3,108,610 | 10/1963 | De See | 137/493 |
| 3,304,952 | 2/1967 | Krone | 137/493.9 |

Primary Examiner—Harold W. Weakley
Attorney, Agent, or Firm—Synnestvedt & Lechner

[57] ABSTRACT

A safety valve for pressure-venting sealed, fluid-holding drums, or other containers, to prevent explosions, and providing for admission of ambient atmosphere to the container, to equalize internal and external pressures and thereby permit fluid to be withdrawn from the container. The valve shell comprises a capped tube, which has only a single thread formed thereon, and a plurality of shelf-like abutments which extend peripherally of interior wall portions of the tube and are shaped and disposed to provide support for interior, nested, valve parts, including a pair of flame-retardant screens, a pair of oppositely displaceable valving devices, valve seat structure, and spring means to establish the loading of each of said devices.

5 Claims, 4 Drawing Figures

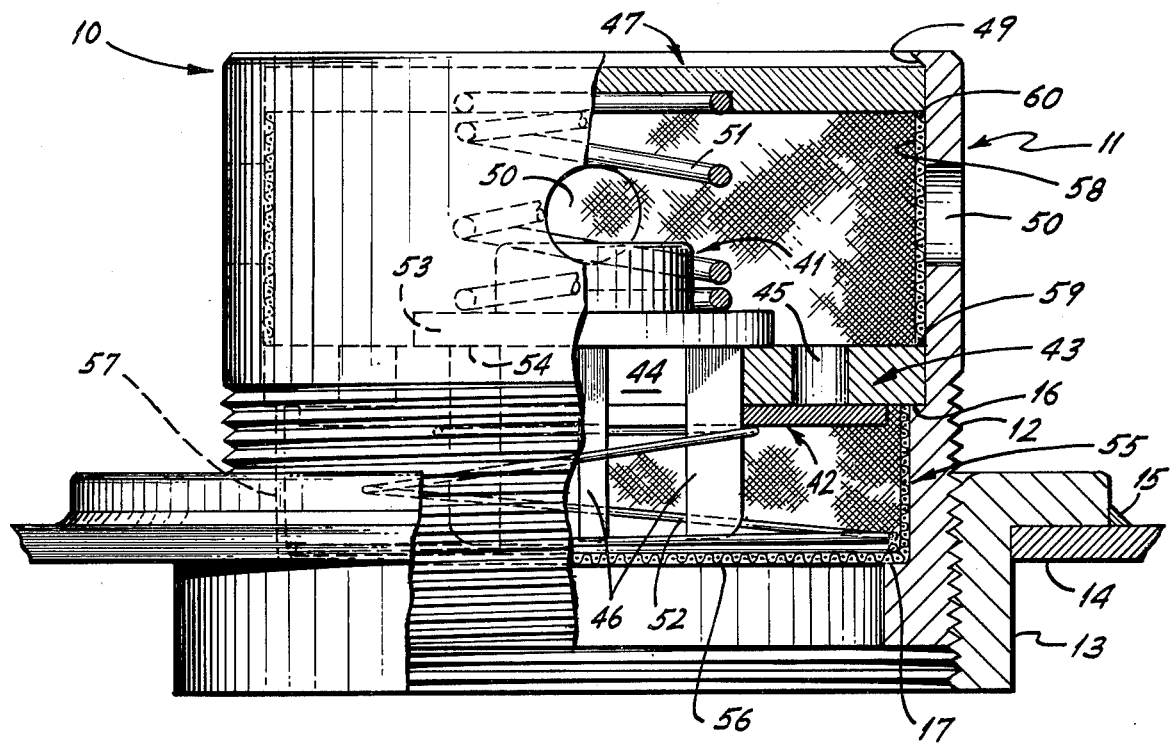
FIG. 1.
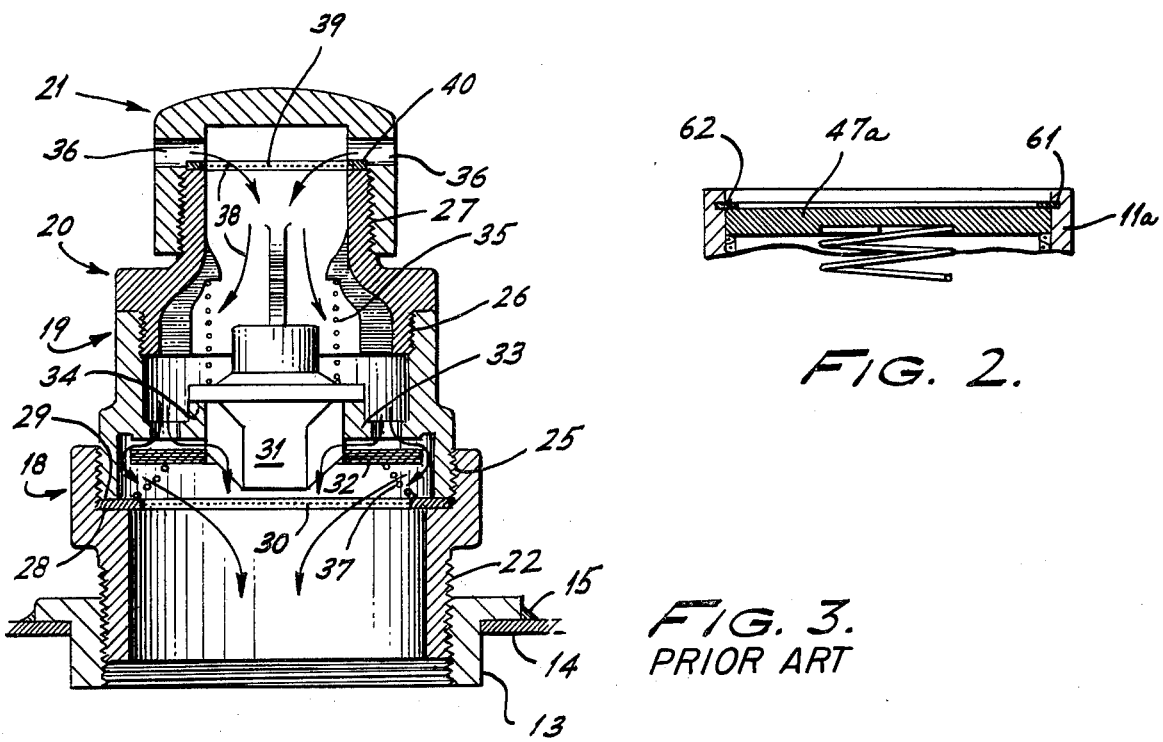
FIG. 2.
FIG. 3.
PRIOR ART

1

SAFETY VENT VALVE

BACKGROUND OF THE INVENTION

Many flammable fluids and liquids commonly in use, for example in industry and agriculture, can be stored in and dispensed from relatively simple containers, such as drums of metal or other materials, provided the proper precautions are observed. Accordingly, the prior art teaches the use of safety valves threadedly associated with the drums, and capable of pressure-venting the drum to prevent explosions, and also providing vacuum relief by admitting ambient atmosphere to the drum, to equalize internal and external pressures and thereby permit the stored substance to be withdrawn through a spigot, or other separate passage, provided for that purpose.

Such valves have been found virtually to eliminate the danger of fire and explosion, by use of flame-retardant screens and by proper control of internal drum pressure. The valves also cut fuel loss, and have the additional important advantage that they operate automatically, and require no adjustment or replacement, even after years of use.

While very advantageous, such known vent valves are subject to a number of limitations and commercial disadvantages, which arise from the nature of their construction and the manner in which they are assembled. In this regard, the best vent valve devices hitherto available have been housed in a shell which is comprised of a number of castings which are inherently rather difficult to make, and therefore expensive. The best mode of associating the castings together, to provide the tight and secure shell which is required, has involved providing each with screw-threaded surfaces for disposition in threaded engagement with similar surfaces provided on mating castings. Provision of the several castings, and the formation of their threads is expensive, and assembly of the valve, including the castings, valve bodies, screens and springs, has proven to be a relatively complicated procedure.

SUMMARY OF THE INVENTION

In accordance with the general objectives of this invention, I have been able to avoid the aforementioned difficulties and disadvantages by provision of vent valve structure of great simplicity which eliminates the need for a number of costly castings and includes only a single threaded surface.

To these general ends, the invention provides a valve shell structure which consists of a tube capped toward one end and having, in the region of the other end, a single threaded portion for association with the drum. All other parts of the valve are nested within the tube, in the simplest possible series of assembly steps. They are held in proper position within the tube by being supported upon one or the other of a pair of peripheral abutments, provided on the inside wall of the tube. The components, including valve bodies, seats, springs and screens, either bear directly against the abutments, or are supported by the abutments through the intermediation of other components.

The new construction has a number of substantial advantages, in addition to the simplicity and cost reduction advantages mentioned above. Among the more important of these are the following:

1. Minimization of use of relatively expensive materials, such as cast brass, black iron, or stainless steel;

2. Certain inteior valve parts, particularly the fire screens, are easier to manufacture and lend themselves to simple assembly;

3. A permanent closure is readily achieved at that end of the valve which is spaced from the associated drum, thereby preventing removal of parts and assuring the integrity of the unit; and 4. The vent valve is considerably more compact, particularly in its extension from the drum (frequently the vertical dimension), and therefor saves space in drum storage racks.

BRIEF DESCRIPTION OF THE DRAWINGS

In the accompanying drawings:

FIG. 1 is a partially elevational, partially sectional view, on a somewhat enlarged scale, showing a vent valve embodying the present invention;

FIG. 2 is a fragmentary, sectional showing, on a smaller scale, of the closed end portion of a valve in accordance with the invention and illustrating a modified arrangement for capping the tube which comprises the valve shell;

FIG. 3 is a sectional view of a prior art vent valve, showing the several cast members which comprise its shell, and the considerable number of threaded portions provided thereon; and, FIG. 4 is an exploded, partially sectional, perspective view, illustrating the parts of the improved vent valve, and the convenient manner and sequence in which they are nested within the tube-like shell.

DESCRIPTION OF THE PREFERRED EMBODIMENT

Figure 4:
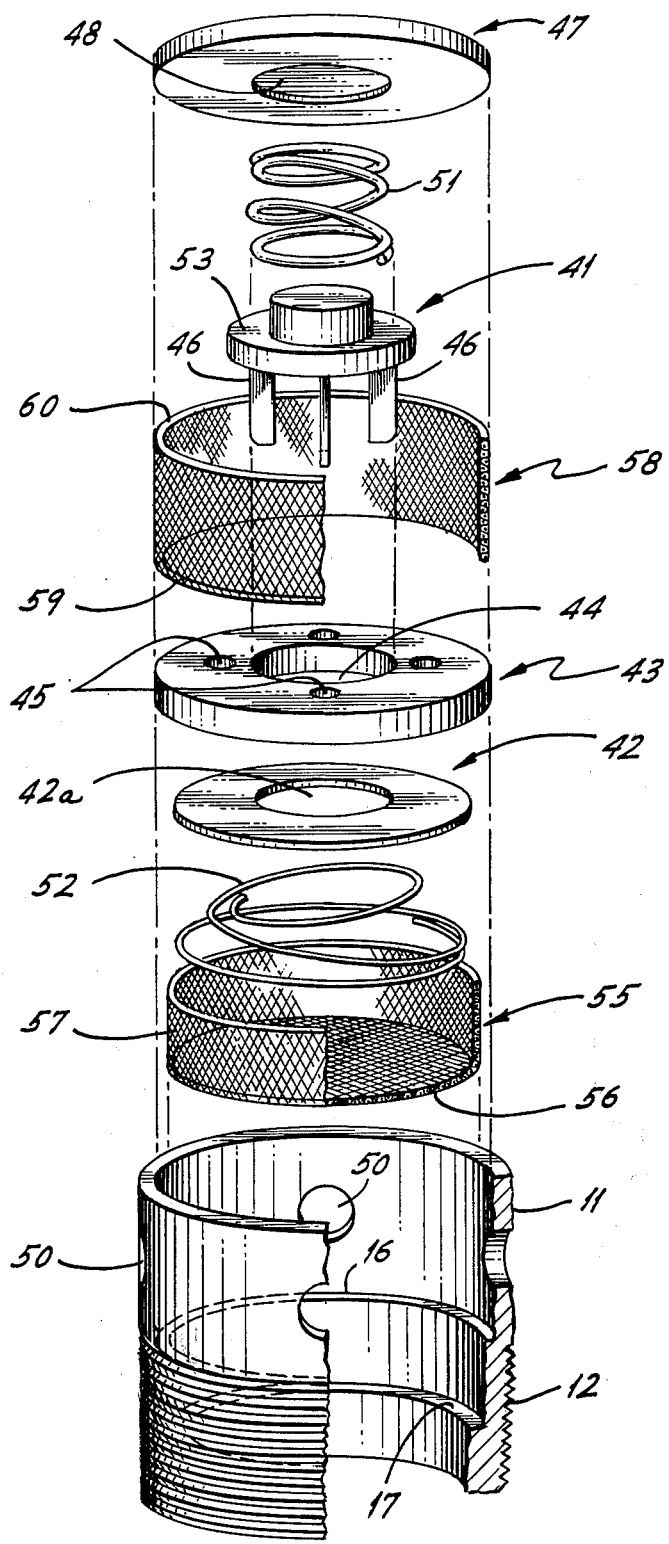

Making reference to FIG. 1, it will be seen that my improved vent valve 10 comprises a shell section 11 which is of tube-like form, and the lower end of which, that is, the end which is "inboard" of an associated drum or container, has external threading 12 formed thereon and cooperable, as shown, with a similarly threaded portion of a flanged collar 13 which is secured within the opening of a drum, indicated fragmentarily at 14. It is preferred to use a standard, tapered pipe thread in securing the tube 11 to the collar 13. The collar may be secured within the drum in any convenient manner. For example, it may have a so-called "crush-fit" within the drum opening. However, in the illustrated embodiment, the collar is secured to the drum by welding, as shown at 15. When the valve 10 is mounted within the collar, hand-tightening of the tube 11 in collar 13 is generally sufficient.

Various materials are suitable for use in manufacturing the vent valve. For example, it may be made of brass, or for certain applications, it may be desirable to fabricate the entire valve of stainless steel, or black iron. In any event, the tube may be made of a standard piece of tubing, bored and counter-bored, to produce the abutments desired below. Certain springs, the functions of which are also described later, would be fabricated of suitable alloys, as is known in the art.

In particular accordance with the present invention, all of the interior valve parts are nested within the tube shell 11, as will be explained in detail below, being supported by one or the other of a pair of abutments 16 and 17. These abutments are shelf-like in form, they extend inwardly of the tube 11, peripherally around the interior surface thereof (see particularly FIG. 4), and define component-support surfaces lying generally in planes transverse (preverably perpendicular to) the axis of the tube. Before describing the novel manner in which these abutments support all of the interior components, or parts, of the vent valve and promote easy assembly of the same, it will be helpful to refer briefly to the construction and mode of assembly of a vent valve which represents one of the most satisfactory arrangements heretofore known to the art. For this purpose, reference is now made to FIG. 3 which is a sectional illustration of such prior art device.

The apparatus shown in FIG. 3 comprises a series of castings, namely, a tubular base casting 18 which, in turn, supports an intermediate casting 19 which, in turn, supports an outboard (upper as shown) cast fitting 20 which is closed by a cast cap 21. The considerable vertical extension of a valve of such known construction, is readily apparent from comparison of the vertical dimension of the device shown in FIG. 3 with the improved construction shown in FIG. 1, the comparison being particularly meaningful when it is recognized that the scale of FIG. 3 is only about one-half the scale of FIG. 1.

The prior art arrangement, has its inboard, or lower, tubular end threaded at 22, and engaged with the threaded collar 13 secured within the drum 14, as by welding 15. In the use of such lower threading, and its mode of cooperation with the drum, the earlier device resembles the apparatus of the present invention. However, unlike the improved device, the prior art apparatus will be seen to require a number of additional threading operations, typically six more; these operations are required to form the internal and external cooperative threads which appear at 25, 26 and 27, and which serve to maintain the various castings 18, 19, 20 and 21 secured together. It will be recognized that formation of such a number of additional threads, and maintenance of fluid-tight connections at each thereof, represents substantial complication and expense. This earlier device includes a single abutment, provided at 28 on casting 18, and this abutment supports a ring 29 which forms the periphery of an inboard flame-retardant screen 30.

The internal structure of the device of FIG. 3 comprises a valve body 31, for pressure-venting the drum, and a vacuum relief valve 32 of centrally apertured, plate-like form. Valve seat structure 33 is formed integrally with the casting 19. This seat structure has an annular seating rim 34, against which the outwardly projecting flange of the valve body 31 seats, the flange of said valve body being urged against the seating rim by a spring shown somewhat diagramatically at 35. As will be understood by those skilled in this field, the force of the spring 35 is so chosen as to prevent the internal drum pressure from rising to a value at which explosion might occur. The manner in which displacement of the valve body 31, upwardly of the seating rim 34, serves to vent the drum, through apertures 36 provided in the cast cap 21, will be understood without further description. Similarly, the functioning of the annular vacuum-relief valve 32 (which is shown as having moved to its open position gainst the predetermined force of its loading spring 37) will be appreciated by reference to the arrows 38 which have been used in FIG. 3 to designate the airflow which occurs during vacuum relief. Under pressure-relief conditions, the direction of airflow is, of course, opposite to that shown by the arrows 38. A second flame-retardant screen 39, which also includes a peripheral seating ring 40, is maintained in position against the upper edge of casting 20 through the intermediation of cap 21.

In such prior art, having gone to the difficulty and expense of providing the several castings, the interior valve parts, and seven threaded surfaces, assembly of the device will be understood to require insertion of lower screen 30, with its peripheral ring in contact with abutment 28, followed by positioning of spring 37 over the periphery of screen 30. This operation is followed by location of the valve 32, in position upon the upper end of its spring 37, after which casting 19 is tightly and securely threaded within casting 18. The explosion-relief valve 31 may then be placed within casting 19, and its spring 35 disposed to react between said valve body 31 and cooperating surfaces of casting 20. Casting 20 is then threaded within casting 19, the upper screen 39 is positioned upon the upper edge of casting 20, and the assembly is completed by engaging and sealing the cap 21 against the fitting 20. As will be recognized by consideration of FIG. 3, a disadvantage of this arrangement lies in the fact that parts, for example the cap, may be readily removed from the valve, then be returned to seated position, without the insertion of screen 39, or other components. Similarly, if the valve is separated, for example at the cooperating threads 25, or for that matter at either of threads 26 or 27, it would be possible to reassemble the device omitting one or more of the internal parts 30, 31, 32, 35 or 37. This can result in a hazardous condition, since all components are required for adequate protection.

Returning now to the novel vent valve of the present invention, and with particular emphasis on the exploded perspective showing of FIG. 4, the relatively simple construction and mode of assembly of the improved device will become apparent. The vent valve of this invention includes valve bodies 41 and 42 which are, respectively, disposed for association with upper and lower sides of a generally disc-like valve seat structure 43. As appears to good advantage in FIG. 4, the seat structure is of very simple form having a central aperture 44 and a number of, in this case four, vacuum-relief apertures 45 which are cooperable with valve 42, as will be described. The upper, pressure-relief valve body 41 includes several downwardly extending fingers 46, the outer surfaces of which lie on a circle of such diameter that the fingers fit snugly within the central aperture 44 of seat structure 43. The projecting fingers 46 are, of course, slidably received within the aperture 44 of plate-like seat structure 43, as appears in FIG. 1, and serve to guide and position the valve body 41 during displacement from the seat structure.

The outboard end of shell or tube 11 is closed by a lid member 47 which has a shallow, central, spring-locating recess 48 (see FIGS. 1 and 4). After assembly of the device, in the manner described below, the lid is securely and fixedly retained within the shell in either of two preferred ways. As shown in FIG. 1, it can be secured by swaging or rolling the adjacent peripheral end of tube 11, as at 49, to secure the lid in the position shown in FIG. 1. The upper end of the tube 11 is apertured (see the several apertures shown at 50) for use in preventing explosion and relieving vacuum.

As mentioned earlier, and as is the case with the prior art device, the explosion-prevention and vacuum-relief valves 41 and 42, respectively, are urged toward the seat structure 43 through the agency of springs of predetermined loading. The upper and heavier spring 51 provides the desired degree of pre-loading of the pressure-relief valve 41, while the lower spring 52 provides predetermined light loading of the vacuum-relief valve 42 toward the lower side of seat structure 43. Specific values of spring loading will, of course, be determined by the particular service for which the valve is designed, and by its physical dimensions.

As will now be understood, valve 42, when in contact with the lower side of seat structure 43, closes the vacuum-relief openings 45. Conversely, when the valve moves to open position (not shown) relief of vacuum within the drum 14 takes place by the inflow of ambient atmosphere through the openings 50, the inflowing atmosphere then passing through openings 45, around edge portions of valve 42, and into the drum. In similar manner, the valve body 41, shown closed, is displaceable above the upper surface of seat structure 43, against its spring 51, when the pressure within the drum exceeds a predetermined value established by the spring loading. In the seated position shown in FIG. 1, the peripheral flange portion 53 of valve body 41 closely overlies an annular portion 54 of said structure 43 (FIG. 1), and thereby seals the central opening 44. As will be understood without further description, should the pressure within the associated drum exceed the predetermined explosion-relief value, the valve body 41 is displaced upwardly against its spring 51, being guided by the fingers 46, and fluid flows from the interior of the drum through the opening 44 and an aligned opening 42a in valve 42 (FIG. 4), around the flange 53 of valve body 41, and thence outwardly of the valve through the openings 50 in integral tube 11.

The valve also includes a pair of improved flame-retardant screens. The screen 55, shown in the lower position in the drawings, is of basket-like form having a lower wall 56 which spans the interior area of tube 11, and an annular side wall 57 which is of a size to fit snugly within the tube, with the screen resting against lower abutment 17. The upper screen 58 is of cylindrical form and is sized to fit within the upper part of tube 11 with its lower annular surface 59 in contact with the underlying seat structure 43, and with its upper annular surface 60 bearing against the lower surface of lid 47. In this position the screen 58 provides flame-retardant protection across the openings 50.

The very simple manner in which the valve may be assembled, is particularly apparent from FIG. 4. As will be understood from this figure, the lower screen 55 is lowered within tube 11 until it is seated against the abutment 17, the spring 52 is placed within the screen, with valve 42 disposed thereon. The seat structure 43 is now brought into bearing relationship with the upper abutment 16, after which the valve 41 is so disposed that its fingers 46 project downwardly through the central apertures 44 and 42a, of the two valve bodies, in a position in which the fingers are encircled by spring 52. The lower screen is of such height that it fits precisely between the abutment 17 and the lower surface of seat structure 43. The upper screen 58 is then dropped within the tube 11, with its lower edge bearing against the upper annular surface of seat structure 43. Insertion of the spring 51, and seating of the lid 47 against the upper edge 60 of screen 58, completes assembly of the valve parts in proper, nested relation.

While, as stated above, the tube may be swaged or rolled across the lid 47, to maintain the parts in secure assembly, securement can be accomplished in other ways. For example, as shown in FIG. 2, the upper tube-like portion 11a of a valve may be provided with a peripheral recess, as shown at 61, and a spring ring 62 may be used, in cooperation with the recess, to retain a lid 47a in assembly. Such spring rings are well known and require no detailed description here, other than to point out that it is a simple matter to insert them securely within the peripheral aperture, by use of tools which are readily available.

From the foregoing description it will be understood what simplification is achieved by utilization of the principles of this invention. Not only are the component parts of the valve considerably less expensive, but it is possible to assemble them without the necessity of making any threaded connections, with consequent elimination of seals thereat. The screens are very simple, requiring no peripheral mounting rings, the vertical dimension of the valve is minimized, and a valve, once assembled, is virtually tamper proof.

I claim:

1. In a safety valve of the kind including a pair of spring-loaded valve bodies, one displaceable to pressure-vent an associated container, to prevent explosion thereof, and the other displaceable to provide relief of vacuum within the container, to permit withdrawal of fluid therefrom, the improvements which comprise: a valve shell structure which consists of a tube capped toward one end thereof and apertured in the region of that end, said tube having in the region of an opposite end, a threaded portion for association with a container; a pair of shelf-like abutments spaced along the axis of the tube, extending inwardly of the tube, and peripherally of interior wall portions thereof; and a plurality of interior valve components all nested within said tube and supported by said abutment surfaces, said components including a pair of valve bodies, flame-retardant screen means, valve seat structure with respect to which the mentioned valve bodies are displaceable, and a pair of springs each of which urges an associated one of said valve bodies toward said seat structure, the improvements being further characterized in that said seat structure bears against one of said abutments; and said screen means includes two screens, one of which is seated upon the surface defined by the other of said abutments and extends across the open end of said tube, and the other of which screens extends across the apertured portion of said tube and has spaced, generally annular, portions one of which rests against the tube cap and the other of which bears against a surface portion of said seat structure, to maintain said other screen in position.

2. A valve construction in accordance with claim 1, and in which said one screen is of basket-like configuration, and includes an annular wall portion conforming to interior surface portions of said tube, said one screen being snugly nested between said other abutment and said valve seat structure.

3. A safety valve, comprising: an integral tube of generally circular cross-section, open at one end and provided with aperture means adjacent its other end, said tube having a pair of shelf-like abutments, spaced along its axis, extending peripherally of interior tube wall portions and shaped and disposed to provide support surfaces lying generally in planes transverse the tube axis; a first flame-retardant screen carried by one of said abutments and extending across said oepn end; disc-like valve seat structure carried by the other of said abutments and having a valve seating area on each of its opposite sides, with passage means extending through said seat structure and having portions disposed in and individual to the region of each of the seating areas; a pair of valve bodies, one movable between positions it which it opens and closes the passage means individual to one of said seating areas, and the other movable between positions in which it opens and closes the passage means individual to the other of said areas; a pair of spring means each effective to urge an associated one of said valve bodies toward its seating area; a second flame-retardant screen supported by one of said sides of said seat structure, and extending across the aperture means; and lid means closing said other end of said tube.

4. A safety valve according to claim 3, and further characterized in that: said lid means is disposed within said tube; one of said spring means is disposed to react against said lid means; and edge portions of said tube, adjacent said other end, extend over peripheral portions of said lid means to retain the latter and thereby prevent removal of said screens, seat structure, valve bodies, and spring means, from said tube.

5. A safety valve according to claim 3, and further characterized in that: said lid means is disposed within said tube; one of said spring means is disposed to react against said lid means; and resilient ring means is provided which extends around peripheral portions of said lid means, and reacts against said tube to retain said lid means and thereby prevent removal of said screens, seat structure, valve bodies, and spring means, from said tube.

* * * * *